United States Patent Office 3,453,160
Patented July 1, 1969

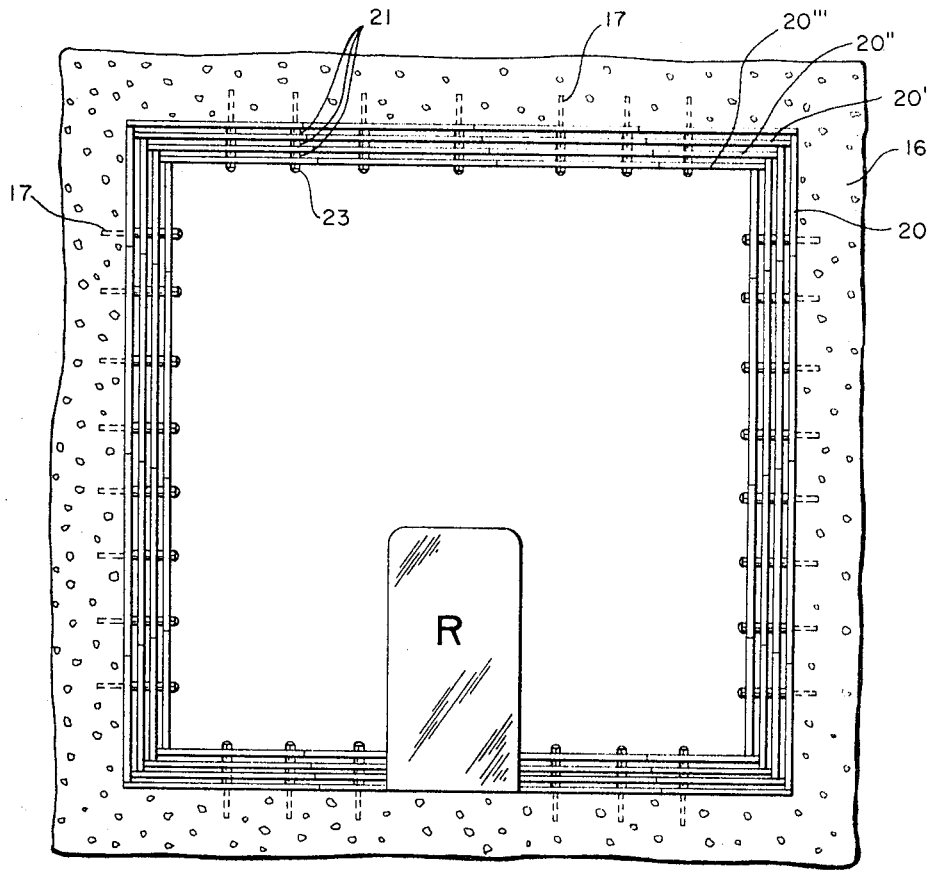
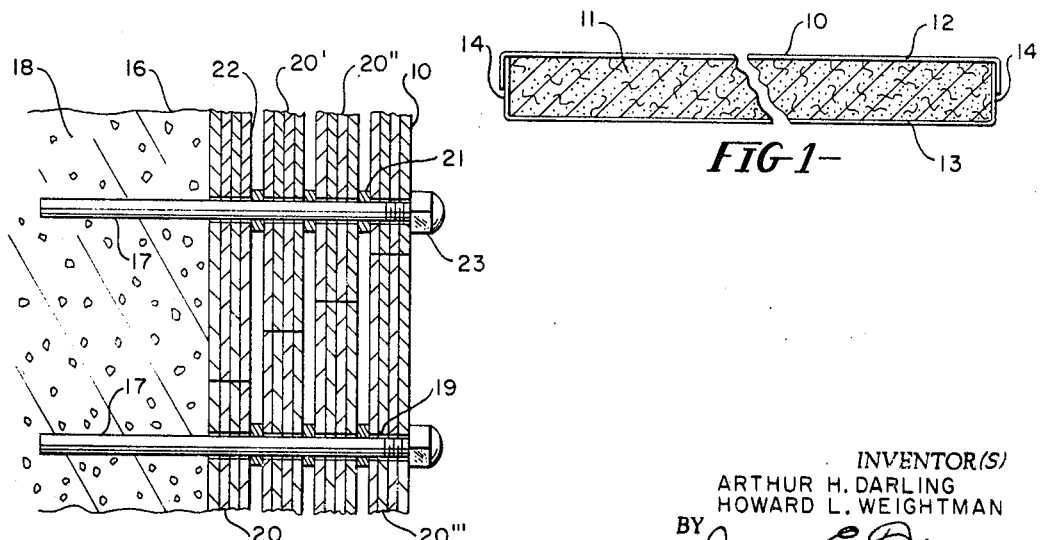

3,453,160
PROCESS FOR MAKING STRUCTURAL GYPSUM BOARD FOR NEUTRON SHIELDING
Arthur H. Darling, Concord, and Howard L. Weightman, Walnut Creek, Calif., assignors to Kaiser Gypsum Company, Inc., Oakland, Calif., a corporation of Washington
Filed Nov. 12, 1963, Ser. No. 322,618
Int. Cl. B32b 13/00
U.S. Cl. 156—39      1 Claim This invention relates to nuclear reactor structures; and more particularly it relates to shielding means therein.

In neutronic reactors, as it well known, a neutron fissionable isotope or mixtures of such isotopes are subjected to fission by adsorption of neutrons produced in the system; and a further supply of neutrons is evolved by the fission to establish and maintain a self-sustaining chain reaction. As is also well known, leakage of the neutrons occurs from the exterior surface of a finite reaction system and the neutrons issuing from such surface must be prevented from freely entering the surrounding area or atmosphere. This has been accomplished by disposing such reactors within concrete enclosures whereby the neutrons impinge on and penetrate the concrete structure and are thermalized therein. The surface areas of the concrete which are exposed to the neutrons become activated and this condition also penetrates a substantial distance below the surface of the concrete so exposed. The result is that after a period of time the concrete enclosure or vault within which the reactor is disposed becomes dangerous for occupancy, so that it must be allowed to stand for long intervals after shutdown of the reactor before personnel can enter. The activated materials, in other words, require several days' time to decay through their varying half-lives. This has been a very expensive and time consuming operation, in view of the fact that operation of the reactor must be suspended during the time of deactivation of the concrete wall or chamber.

It has now been found that neutrons issuing from neutronic reactors are substantially thermalized and moderated by a structure which comprises, as a major portion thereof, a mass of set gypsum crystals containing at least 4% by weight, expressed as $B_2O_3$, of a boron material, based on the total weight of gypsum plus boron compound. In a preferred embodiment, the composition is provided for such lining material in the form of paper-covered gypsum wallboard. For ease of manufacture and transportation it has been found advantageous to provide the gypsum composition in the form of paper-covered wallboards of half-inch thickness, which are then installed in groups of superimposed boards, as desired, to provide a substantial mass of gypsum between the neutron source and the concrete vault or enclosure, to shield the surface of the concrete from direct impingement by the neutrons. Alternatively, the composition can be provided in the form of structural gypsum, i.e., gypsum concrete, consisting essentially of a major portion of calcined gypsum and at least 4% boron material expressed as $B_2O_3$, ready mixed and shipped in bags or in bulk, which can then be mixed with water, for example, and cast into monolithic walls, or into bocks or the like at the site of use. These monoliths or blocks can then be fitted together within the concrete enclosure to form the protective mass.

In the annexed drawings, FIGURE 1 is a cross-sectional view of a paper-covered gypsum-coreboard made according to this invention.

FIGURE 2 represents schematically one mode of placement of the gypsum lining with respect to the concrete vault and the neutronic reactor.

FIGURE 3 shows one mode of installing the lining within a concrete vault for a reactor.

In producing the gypsum mass of the present invention, raw gypsum rock is calcined in the known manner to provide a dehydrated gypsum, preferably the hemihydrate, $CaSO_4 \cdot \tfrac{1}{2} H_2O$. The gypsum should be of high purity and preferably is substantially free of neutron-activatable materials, especially iron, sodium, manganese, aluminum, and magnesium. It is preferred that the total amount of such activatable materials, particularly those mentioned hereinabove, should not exceed 0.1% based on the weight of gypsum, $CaSO_4 \cdot 2H_2O$, plus boron compound. When making paperlined boards, employing as starting material a raw gypsum rock which contains as impurity an appreciable amount of a compound evolving carbon dioxide, such as calcium carbonate, it is particularly advantageous to include in the aqueous slurry sufficient alkaline agent, e.g. ammonia, to maintain a slurry pH of about 6.0 to 7.5 and to prevent any substantial evolution of gas from the gypsum slurry from which the board or cast mass is formed. One such source of gypsum rock is that mined in the vicinity of Rosario, N. Mex., and such gypsum rock typically contains from 1% to 5% calcium carbonate. As will be further explained below, in preparing calcined gypsum slurry from such rock especially for production of wallboard, with incorporation of boric acid, it is advantageous to incorporate also sufficient ammonia, in the form of ammonia gas, to maintain a pH in the slurry of from 6.0 to 7.5, or substantial neutrality, to prevent evolution of gas from the slurry during forming of the board and setting of the mass in order and to obtain a well-finished paper-covered wallboard therefrom.

The boron compound which is added in the composition and method of the present invention is preferably orthoboric acid, $H_3BO_3$, but other boron materials are useful. In making paper-lined boards, there can alternatively be employed other boron compounds which do not deleteriously affect the paper liners such as, for example, finely divided boron, colemanite, $Ca_2B_6O_{11} \cdot 5H_2O$ or finely divided boron oxide or mixtures of these with each other. In making structural gypsum or plaster still other boron compounds are useful, e.g. ammonium biborate. Where boron materials or compounds are employed which are insoluble in or slightly soluble in water, it will be understood that the material preferably is finely sub-divided and uniformly dispersed through the mass. It is preferred to employ boron compounds which are substantially free of sodium because this metal becomes highly radioactive upon bombardment with neutrons which increases the length of time that the structure is not habitable and also increases the difficulty of satisfactory disposal of the lining at the end of its useful life. A very satisfactory paper-lined wallboard is obtained by incorporating in a cacined gypsum slurry, sufficient boric acid to provide in the mass of said gypsum crystals obtained, from about 4% to 10%, preferably about 6% to 7%, expressed as $B_2O_3$, of boric acid based on the total dry weight of gypsum plus boric acid. It is advantageous to incorporate an accelerator to facilitate the set of the gypsum crystals, when adding such amounts of boric acid which tends to act as a retarder for the set. Such accelerators are well known manner to secure sufficiently rapid set.
incorporated in the slurry raw gypsum crystals in finely divided form and if desired potassium sulfate or another accelerator such as well known in this art and in the known manner to secure sufficienty rapid set.

Where ammonia is employed in the production of board according to this invention, such ammonia is preferably added in the form of ammonia gas as commercially available in containers, under compression. This constituent is suitably added to the mixing water prior to incorporating the same in the gypsum slurry mix, suitably to maintain in such slurry a pH of from 6.0 to 7.5.

Any other desired mode of incorporation in the slurry can be used. In order to maintain the proper conditions in the slurry to prevent any substantial evolution of gas in the event that a raw gypsum rock is used which contains from 1% to 5% calcium carbonate, it has been found preferable to incorporate from 0.25% to 0.55% ammonia, based on total dry weight of the ammonia plus boron compound plus set or crystallized gypsum. That is, where a material is present in the slurry which is reacted upon by a weak acid, e.g. boric acid, to yield $CO_2$ gas, it is advantageous to incorporate ammonia as described herein to prevent evolution of such gas in the formation of paper-covered wallboards.

In carrying out the process of this invention, a plastic slurry of calcined gypsum is made up in the usual way, by admixing water, gypsum hemi-hydrate, an accelerator to enable more rapid set of crystalline gypsum mass, a boron compound, preferably boric acid, as above described, fibers and other suitable additives, and the slurry is cast into form, allowed to set, hardened and dried. Most advantageously, the slurry is cast between paper liners in the known manner on a board-forming line, and allowed to set, and is hardened and dried. Drying takes place in a heated drying zone, in the usual manner, e.g. at temperatures of from approximately 400° F. to about 210° F. As noted above, where the gypsum rock contains $CaCO_3$, this latter compound is not broken down and $CO_2$ driven off at the temperatures employed in the calcination of gypsum rock to convert $CaSO_4 \cdot 2H_2O$ to $CaSO_4 \cdot \frac{1}{2}H_2O$. Therefore, the $CaCO_3$ exists as such in the slurry and decomposes therein upon addition of an acid such as boric acid to yield $CO_2$ gas. Evolution of such gas has been found disadvantageous in making paper-covered wallboard because it tends to cause complete loss of or at least partial peeling or blistering of the paper liner from the final board and swelling of the core. It has also now been found, however, that incorporation of ammonia prevents this undesirable result, as discussed hereinabove. Suitably, ammonia gas is incorporated in the mixing water in the water-holding tank just prior to addition thereof in the slurry in the mixing zone and just prior to casting of the slurry between the paper liners. The boron compound is suitably admixed in the form of a dry powder, but can be added as a water solution, when of suitable solubility, to insure good dispersion through the slurry. The final paper-covered boards, therefore, comprise paper liners and a core comprised of, as a major portion, set gypsum crystals, and from 4% to 10% boron compound expressed as $B_2O_3$ and, suitably, small but effective amounts of other additives well known in the art of making gypsum-core wallboards, such as, paper fibers, an accelerator such as potassium sulfate, starch, hydrated lime, and a weight-reducing material such as expanded perlite. It has further been found in the production of paper-covered boards according to this invention that the core should also contain from 0.5% to 2.0% free water in order to reduce the brittleness of the board and to facilitate handling and shipping with avoidance of excessive breakage thereof.

It has been found most advantageous to form the gypsum slurry mixture into boards of one-half inch thickness, to facilitate handling, shipping and installation with minimal breakage. However, if desired, boards of ⅜ inch, ⅝ inch or other thickness can alternatively be made, if desired. The board is suitably installed within the concrete vault to line the walls, floor and ceiling thereof in units of approximately two-inch thickness made by attaching four single half-inch boards together in face-to-face relationship, i.e. by installing in groups of four such boards. The boards are generally provided in sizes of 4 ft. x 8 ft. x ½ inch, but, alternatively, other sizes can be employed, if desired.

With reference to the annexed drawings, 10 is a gypsum-core board made according to this invention wherein core 11 comprises a mass of set interlaced gypsum crystals having dispersed within it the boron compound of the type and in the amount disclosed elsewhere herein. The core is covered by paper liners 12 and 13. In the embodiment shown in FIGURES 1 and 3, the edges 14 of the board are square but alternatively they can be tapered, if desired. Preferably the paper liners overlap, as shown in FIGURE 1 but in another embodiment, the edges of the board can remain uncovered, the linears extending over the upper and lower faces of the board only.

Successive boards, each having two flat faces, two side edges and two end edges, are installed together as shown in FIGURE 3. In a preferred embodiment, the boards in groups of four are applied as lining within the concrete housing 16 for the reactor R, as shown in FIGURES 2 and 3. Bolts 17 are embedded in the wall 18 of concrete vault 16 and extend inwardly therefrom into the interior of the enclosed space.

Holes or apertures 19 are drilled in each group 20 of four boards 10 to accommodate bolts 17. A unit, or group of boards, 20, is placed over the surface of wall 18, bolts 17 extending through apertures 19 and supporting group 20. A washer 21 is slipped over bolt 17 against outer face 22 of group 20. A second group 20' is then placed over the first, spaced therefrom to accommodate washer 21 in this instance, although other arrangements can be employed; and so on until as many groups as needed to obtain the desired degree of shielding in any given installation. Four such groups 20, 20', 20'', and 20''' are shown for convenience in the drawings. A cap nut 23, or other suitable device is then placed over the end of bolt 17 to hold the innermost or final laminate 20''' in place. Suitable ducts and access doors are provided in vault 16 but are not shown, as not essential in the description of this invention.

It is an advantage of the present invention that a product is provided which effectively minimizes passage therethrough of neutrons when subjected to substantial attack by such particles; and it has been found that shielding or capture is effective with both fast flux and thermal flux. When installed as a lining within a concrete vault or enclosure for a neutronic reactor, the product of this invention minimizes activation and thermal flux effects in the surface areas of the concrete vault walls, floors and ceilings, and also further ensures against escape to the surrounding atmosphere. It is a particular advantage that the process and composition of the present invention enable the production of a structural board, or wallboard, effective as described herein, which can be made economically on existing board-forming equipment and which can be handled, shipped and installed in the usual manner of handling and installing of dry wall construction materials, or in any other desired manner.

EXAMPLE 1

As an example of one mode of carrying out this invention an amount of raw gypsum rock, containing as impurities less than 0.5% total amount of Fe, Al, Na, Mn and Mg, is calcined in the known manner to provide calcium sulfate hemi-hydrate, $CaSO_4 \cdot \frac{1}{2}H_2O$. This is made into a water slurry according to the following formula: A mixture is prepared of 1500 lbs. of calcined gypsum, 17 lbs. of paper fibers, 12 lbs. of starch, 4 cu. ft. expanded perlite, 3.2 lbs. of lignin, 1.4 lbs. of potassium sulfate and 70 lbs. of raw gypsum. This mixture is mixed with about 1200 lbs. of water, and 200 lbs. of orthoboric acid is admixed therewith. A small amount of soap foam is added if desired for weight reduction, and the slurry is deposited between paper liners in the known manner, formed into board, hardened and dried, the finished board having a dry weight of approximately 2100 lbs. per 1,000 sq. ft. The core appearance is good and the paper liners adhere well to the core. When tested as a shield against neutron impingement it is found that the ability of the gypsum board to absorb or moderate neutron flux is many times that of the same thickness of ordinary portland cement-base concrete; and when used as a shield between the neutron source and a concrete mass, the thermal flux within the concrete is reduced and its peak is shifted inwardly within the concrete mass resulting in greater self-shielding within the concrete itself.

EXAMPLE 2

In another example, raw gypsum rock as mined at Rosario, N. Mex., and containing only traces of Fe, Mg, Mn, Al and Na or a total of less than about 0.1% thereof, is calcined and made into a slurry in the following proportions per thousand sq. ft. of board to be produced: 1,400 lbs. calcined gypsum, 14.7 lbs. starch, about 3½ cu. ft. or about 14 lbs. expanded perlite, 25 lbs. paper fiber, 0.5 lb. potassium sulfate, 0.21 lb. commercial retarder, 200 lbs. boric acid, 2 lbs. hydrated lime, about 1200 lbs. of water or sufficient to make a plastic slurry, and from 5 to 9 lbs. ammonia gas to maintain a slurry pH of 6.0 to 7.5. The materials are mixed together as described hereinabove, the ammonia being mixed with the water prior to introduction of the water into the mass. The slurry is deposited between paper liners and formed into board in the known manner on a commercial production board-forming line. The dry weight of the finished board averages between 1,950 and 2,150 lbs. per M. sq. ft. The core of the finished board has a good appearance and the paper liners adhere well thereto. When the board of this example is tested as a neutron absorber and as a shield for concrete, as in Example 1, the results are still better. The greater purity of the gypsum is advantageous and the deactivation time of the board is substantially less where the neutron-activatable impurity elements are present in only trace or small amounts, to a total of less than 0.1% by weight of the gypsum.

It is a particular advantage of the present invention that it provides a substantial content of hydrogen in the final product which is effective in thermalizing neutrons, especially fast neutrons. The hydrogen is provided in the water of crystallization of the set gypsum, also in the boric acid where this compound is incorporated, in paper liners on boards so made and in any free water present in the mass. It is preferred for best results that the composition of the present invention be substantially free of neutron-activatable elements and especially that the total sodium, iron, aluminum, manganese and magnesium not exceed 0.1% based on the total weight of gypsum plus boron compound.

It will be understood that the calcined gypsum slurry, or gypsum slurry, referred to herein is the usual slurry of calcined gypsum, i.e. calcium sulfate hemi-hydrate, $CaSO_4 \cdot \frac{1}{2}H_2O$, in water as well known in this art and that it also includes besides calcined gypsum, boron compound, ammonia and water, other constituents which are employed in the board-forming art and in amounts known in this art, to produce good paper-covered board therefrom. Such constituents can include, e.g., fibers, starch or starch derivative, a consistency modifier, foam or other constituent, but are preferably substantially free of neutron-activatable materials. Instead of ammonia, other suitable alkaline agents are useful to maintain the desired pH in the plastic slurry, such as, for example, potassium hydroxide, hydrated lime; and these agents also are preferably substantially free of neutron-activatible elements, especially sodium. However, ammonia has been found to give optimum results in the production of paper-lined board. Alternatively, or additionally to the incorporation of the alkaline agent such as ammonia, evolution of gas from a calcium carbonate-containing slurry as described is minimized or substantially prevented by maintaining a lower-than-usual slurry temperature, especially by maintaining a temperature of 65° F. to 70° F. Normally, in the preferred practice of this invention a set-retarder is not needed because the boric acid acts to retard the set, and in this event addition of an accelerator is usually advantageous.

In the present specification and claims, percentages and parts are by weight, unless otherwise indicated. The expanded perlite shown in the above examples has an average bulk density of about 3 to 6 lbs. per cu. ft. It is to be understood that the term "wall board" or "board" as used herein is intended to include board, panels, lath, tile and similar products. It is also to be understood that suitable mixtures of boron materials can be added in the composition, if desired. Other drying temperatures can be employed if desired. "Structural gypsum" can include plaster and concrete, the latter also containing suitable aggregate, such as expanded perlite, in addition to the composition of the present invention. In drying paper-lined board made according to this invention it is sometimes advantageous to provide perforations n the paper to facilitate drying.

Having now described the invention, what is claimed is:

1. In a method of forming a paper-lined board adapted to resist passage therethrough of neutrons impinging on a surface thereof, and containing as major portion a mass of set gypsum crystals, the steps which comprise calcining a raw gypsum rock containing calcium carbonate to form calcium sulfate hemi-hydrate containing said carbonate, intimately admixing with said calcined material from 4% to 10% boric acid expressed as $B_2O_3$ and based on total weight of said boric acid plus said gypsum crystals, separately intimately admixing an amount of water and ammonia, admixing said ammonia-water mixture with said calcined material-boric acid admixture to prevent evolution of gas and to form a plastic slurry having a pH of from 6.0 to 7.5, depositing said slurry between a pair of paper liners, forming into board hardening and drying.

References Cited

UNITED STATES PATENTS

| | | |
|---|---|---|
| 3,043,298 | 7/1962 | Brickman et al. |
| 3,126,352 | 3/1964 | Blair et al. |
| 3,181,985 | 5/1965 | Gates et al. |

ARCHIE R. BORCHELT, *Primary Examiner.*

U.S. Cl. X.R.

250—108; 252—478

PO-1050
(5/69)

UNITED STATES PATENT OFFICE
CERTIFICATE OF CORRECTION

Patent No. 3,453,160          Dated July 1, 1969

Inventor(s) Arthur H. Darling and Howard L. Weightman

It is certified that error appears in the above-identified patent and that said Letters Patent are hereby corrected as shown below:

Column 2, line 60, "known manner to secure sufficiently rapid set." should be -- known in this art. For example, there can suitably be --; line 64, "sufficienty" should be -- sufficiently --. Column 4, line 7, "linears" should be -- liners --. Column 6, line 29, "n" should be -- in --.

SIGNED AND
SEALED
JUL 14 1970

(SEAL)
Attest:

Edward M. Fletcher, Jr.
Attesting Officer

WILLIAM E. SCHUYLER, JR.
Commissioner of Patents